(12) United States Patent
Bach et al.

(10) Patent No.: US 7,825,186 B2
(45) Date of Patent: Nov. 2, 2010

(54) USE OF POLYOLEFIN WAXES IN HOT MELT ROAD MARKING COMPOSITIONS

(75) Inventors: Sebastijan Bach, Langweid (DE); Hans-Friedrich Herrmann, Groβ-Gerau (DE); Gerd Hohner, Gersthofen (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 0 days.

(21) Appl. No.: 12/157,480

(22) Filed: Jun. 11, 2008

(65) Prior Publication Data

US 2008/0262148 A1    Oct. 23, 2008

Related U.S. Application Data

(63) Continuation of application No. 11/244,475, filed on Oct. 6, 2005, now abandoned.

(30) Foreign Application Priority Data

Oct. 6, 2004    (DE) ................. 10 2004 048 536

(51) Int. Cl.
    *C08L 23/12*    (2006.01)
(52) U.S. Cl. .................. 524/582; 524/570; 524/585
(58) Field of Classification Search .................. 524/582, 524/570, 585
    See application file for complete search history.

(56) References Cited

U.S. PATENT DOCUMENTS

| | | | |
|---|---|---|---|
| 3,679,626 A | 7/1972 | Kusa et al. | |
| 5,081,322 A | 1/1992 | Winter et al. | |
| 5,998,547 A * | 12/1999 | Hohner | 525/301 |
| 6,143,846 A | 11/2000 | Herrmann et al. | |
| 6,211,303 B1 | 4/2001 | Hohner | |
| 6,331,590 B1 | 12/2001 | Herrmann et al. | |
| 6,407,189 B1 | 6/2002 | Herrmann | |
| 6,653,385 B2 | 11/2003 | Wang et al. | |
| 7,005,224 B2 | 2/2006 | Hohner et al. | |
| 2003/0096896 A1 | 5/2003 | Wang et al. | |
| 2003/0108807 A1 | 6/2003 | Hohner et al. | |
| 2005/0043455 A1 | 2/2005 | Hohner | |
| 2005/0288412 A1 | 12/2005 | Hohner et al. | |
| 2006/0025508 A1 | 2/2006 | Lechner et al. | |
| 2006/0074171 A1 | 4/2006 | Bach et al. | |
| 2006/0235134 A1 | 10/2006 | Bach et al. | |

FOREIGN PATENT DOCUMENTS

| | | |
|---|---|---|
| CA | 2111363 | 6/1994 |
| DE | 2361055 | 11/1975 |
| DE | 4446923 | 7/1996 |
| DE | 19648895 | 5/1998 |
| DE | 19729833 | 1/1999 |
| DE | 10323617 | 12/2004 |
| EP | 0571882 | 12/1993 |
| EP | 0890583 | 1/1999 |
| WO | WO 2004/104128 | 2/2004 |

OTHER PUBLICATIONS

U.S. Appl. No. 11/586,376; by Heinrichs et al., filed Oct. 25, 2006.
U.S. Appl. No. 11/601,348; by Bach et al, filed Nov. 17, 2006.
U.S. Appl. No. 11/601,298; by Bach et al, filed Nov. 17, 2006.
U.S. Appl. No. 11/601,473; by Bach et al, filed Nov. 17, 2006.
German Search Report for DE 102004048536.4, mailed Jun. 1, 2005.
English Abstract of JP 5414785, Nov. 14, 1979.
European Search Report for EP05020971, Jan. 3, 2006.
DIN 53019, May 1980.
DIN 51801, Dec. 1980.
DIN EN 1427, Dec. 1999.
Co-pending U.S. Appl. No. 12/313,631, filed Nov. 21, 2008 by Hohner.
Co-pending U.S. Appl. No. 12/221,234, filed Jul. 31, 2008 by Herrmann et al.

* cited by examiner

*Primary Examiner*—Robert D. Harlan
(74) *Attorney, Agent, or Firm*—Anthony A. Bisulca

(57) ABSTRACT

The invention relates to hot melt compositions comprising polyolefin waxes prepared using metallocene catalysts, have a dropping point or ring & ball softening point of between 80 and 165° C., have a melt viscosity, measured at a temperature of 170° C., of between 20 and 40 000 mPa·s, and have a glass transition temperature of not more than −10° C. and also to their use as hot melt adhesives and as binders for producing roadmarkings.

10 Claims, No Drawings

USE OF POLYOLEFIN WAXES IN HOT MELT ROAD MARKING COMPOSITIONS

CROSS-REFERENCE TO RELATED APPLICATIONS

This application is a continuation of application Ser. No. 11/244,475, filed Oct. 6, 2005, now abandoned which is hereby incorporated by reference.

The present invention is described in the German priority application No. 102004048536.4, filed Jun. 10, 2004, which is hereby incorporated by reference as is fully disclosed herein.

The invention relates to hot melt compositions comprising polyolefin waxes which have been prepared using metallocene catalysts.

Hot melt compositions or hot melts are thermoplastic materials which are solid at ambient temperature and in the liquid melt state are applied layerwise to suitable substrate surfaces where, following solidification, they exert different functions. They are constructed preferably on the basis of resins, waxes, thermoplastics, and elastomers, and may include additions of fillers, pigments, and additives such as stabilizers, etc.

By way of example, hot melt compositions can be used as solvent-free adhesives for bonding. On account of their multifarious advantages, hot melt adhesives of this kind are increasingly being used in industries including those of packaging, furniture, textiles, and footwear as an economic and environment friendly alternative to conventional, solvent-based adhesives. Constituents of common hot melt adhesive formulas are polar or apolar polymers, generally ethylene-vinyl acetate copolymers, resins, and waxes.

The polar or apolar polymers serve as scaffold material. They ensure the cohesion of the adhesive and at the same time contribute to adhesion to the substrate. The resin addition enhances the adhesion and may exert a compatibilizing effect on the various components of the adhesive. Waxes are used for modification in fractions, based on the hot melt adhesive compositions, of generally less than 10% by weight. They regulate important physical properties of the adhesives, such as hardness, melt viscosity, and softening point, and, in their effect on open time, adhesion, cohesion, etc., they decisively influence the performance characteristics. Wax used in amounts of more than 10% by weight has generally been found to date to be accompanied by a deterioration in the properties, particularly a reduction in the bond strength of the hot melt adhesive.

Hot melt compositions are also used in road construction as thermoplastic binders for producing visual traffic guidance marks, such as "zebra stripes" at pedestrian crossings, center lines or boundary lines, or other signal indications for controlling traffic flow. Besides waxes, the binders employed for this purpose may comprise thermoplastics, resins, and plasticizers. For roadmarking application these binders are generally blended with fillers such as sand or lime, pigments such as titanium dioxide, and light-reflecting additions, e.g., glass beads.

Waxes used to date in hot melt compositions have included macrocrystalline and microcrystalline paraffin waxes, Fischer-Tropsch waxes, and polyolefin waxes. By polyolefin waxes here are meant low molecular mass polyolefins in the molar mass range between about 500 and 20 000 g/mol (number-average molar mass $M_n$) with MFR values, measured in accordance with ASTM D 1238-01, of more than 3000 g/10 min.

Polyolefin waxes can be produced by thermal degradation of branched polyolefin high polymers or by direct polymerization of olefins. Suitable polymerization processes include, for example, high-pressure technologies, in which the olefins, generally ethylene, are reacted free-radically under high pressures and temperatures to form branched waxes, and also low-pressure or Ziegler processes, in which ethylene and/or higher 1-olefins are polymerized using organometallic catalysts under temperatures and pressures which are lower by comparison.

A variant of the low-pressure process which has been disclosed more recently is a procedure in which the organometallic catalysts used are metallocene compounds. These compounds contain titanium, zirconium or hafnium atoms as active species and are generally employed in combination with cocatalysts, examples being organoaluminum compounds or boron compounds, preferably aluminoxane compounds. Polymerization takes place where necessary in the presence of hydrogen as a molar mass regulator. A feature of metallocene processes is that, in comparison to the older Ziegler technology, it is possible to obtain waxes having a narrower molar mass distribution, more uniform incorporation of comonomer, lower melting points, and higher catalyst efficiency.

Surprisingly it has now been found that hot melt compositions comprising polyolefin waxes which have been prepared using metallocene catalysts, have a dropping point or ring & ball softening point of between 80 and 165° C., have a melt viscosity, measured at a temperature of 170° C., of between 20 and 40 000 mPa·s, and have a glass transition temperature of not more than −10° C., are suitable with particular advantage as hot melt adhesives. Hot melt adhesives of this kind display outstanding properties in respect of bond strength (substrate adhesion) and low-temperature flexibility.

Additionally it has been found that the stated hot melt compositions are outstandingly suitable as a constituent of roadmarking materials. Marking materials of this kind possess, in particular, improved adhesion to the road.

The invention accordingly provides hot melt compositions comprising one or more polyolefin waxes which have been prepared using metallocene catalysts, have a dropping point or ring & ball softening point of between 80 and 165° C., have a melt viscosity, measured at a temperature of 170° C., of between 20 and 40 000 mPa·s, and have a glass transition temperature of not more than −10° C.

The polyolefin waxes present in the hot melt compositions of the invention preferably have a dropping point or ring & ball softening point of between 90 and 160° C., a melt viscosity, measured at a temperature of 170° C., of between 50 and 30 000 mPa·s, and a glass transition temperature of not more than −20° C.

The polyolefin waxes present in the hot melt compositions of the invention preferably have a number-average molar mass $M_n$ of between 500 and 20 000 g/mol, more preferably between 800 and 10 000 g/mol, and with particular preference between 1000 and 5000 g/mol, and preferably a weight-average molar mass $M_w$ of between 1000 and 40 000 g/mol, more preferably between 1600 and 30 000 g/mol, and with particular preference between 2000 and 20 000 g/mol.

Examples of suitable polyolefin waxes present in the hot melt compositions of the invention include homopolymers of propylene or of higher 1-olefins or copolymers of propylene with ethylene or with higher 1-olefins, or copolymers thereof with one another. Higher 1-olefins used are preferably linear or branched olefins having 4 to 20 carbon atoms and preferably having 4 to 6 carbon atoms. These olefins may have an aromatic substitution which is in conjugation with the olefinic double bond. Examples thereof are 1-butene, 1-hexene, 1-octene or 1-octadecene, and styrene. The copolymers are composed preferably of 70% to 99.9% and more preferably of 80% to 99% by weight of one kind of olefin. Preference is additionally given to copolymers of propylene with 0.1% to 30%, preferably 1% to 20%, by weight of ethylene.

In one preferred embodiment of the invention the polyolefin waxes present in the hot melt compositions are propylene homopolymer waxes.

In a further preferred embodiment of the invention the polyolefin waxes present in the hot melt compositions are copolymer waxes of propylene and one or more further monomers selected from ethylene and branched or unbranched 1-alkenes having 4 to 20 carbon atoms, the amount of structural units originating from propylene in the copolymer waxes being from 70% to 99.9% by weight. To prepare these copolymer waxes it is also possible to use a variety of the 1-alkenes stated.

In another preferred embodiment of the invention the polyolefin waxes present in the hot melt compositions are copolymer waxes of ethylene and at least one branched or unbranched 1-alkene having 3 to 20 carbon atoms, the amount of structural units originating from the one or more 1-alkenes in the copolymer waxes being from 0.1% to 30% by weight.

In yet another preferred embodiment of the invention the polyolefin waxes present in the hot melt compositions are copolymer waxes of propylene and one or more further monomers selected from ethylene and branched or unbranched 1-alkenes having 4 to 20 carbon atoms, the amount of structural units originating from ethylene in the copolymer waxes being from 0.1% to 30% by weight and the amount of structural units originating from the one or more 1-alkenes in the copolymer waxes being from 0.1% to 50% by weight.

The olefin homopolymer and copolymer waxes used in the hot melt compositions may have undergone polar modification.

The hot melt compositions of the invention may further comprise polyolefin polymers, resins, waxes, plasticizers, polar or apolar polymers, pigments, fillers, stabilizers and/or antioxidants.

The polyolefin waxes used in accordance with the invention are prepared using metallocene compounds of the formula I.

(I)

This formula also embraces compounds of the formula Ia

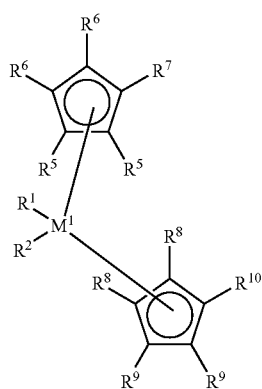
(Ia)

of the formula Ib

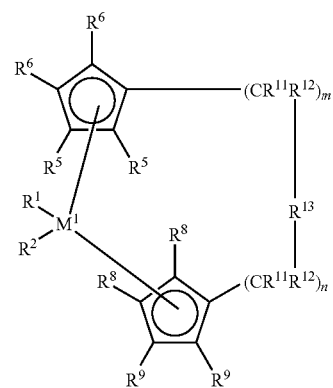
(Ib)

and of the formula Ic

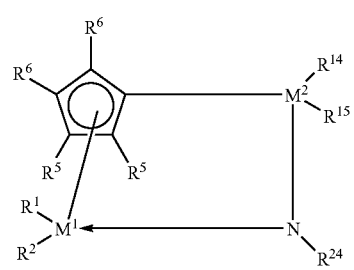
(Ic)

In formulae I, Ia and Ib, $M^1$ is a metal from group IVb, Vb or VIb of the periodic system, examples being titanium, zirconium, hafnium, vanadium, niobium, tantalum, chromium, molybdenum, and tungsten, preferably titanium, zirconium or hafnium.

$R^1$ and $R^2$ are identical or different and are a hydrogen atom, a $C_1$-$C_{10}$, preferably $C_1$-$C_3$ alkyl group, especially methyl, a $C_1$-$C_{10}$, preferably $C_1$-$C_3$ alkoxy group, a $C_6$-$C_{10}$, preferably $C_6$-$C_8$ aryl group, a $C_6$-$C_{10}$, preferably $C_6$-$C_8$ aryloxy group, a $C_2$-$C_{10}$, preferably $C_2$-$C_4$ alkenyl group, a $C_7$-$C_{40}$, preferably $C_7$-$C_{10}$ arylalkyl group, a $C_7$-$C_{40}$, preferably $C_7$-$C_{12}$ alkylaryl group, a $C_8$-$C_{40}$, preferably $C_8$-$C_{12}$ arylalkenyl group, or a halogen atom, preferably chlorine atom.

$R^3$ and $R^4$ are identical or different and are a mononuclear or polynuclear hydrocarbon radical which together with the central atom $M^1$ may form a sandwich structure. Preferably $R^3$ and $R^4$ are cyclopentadienyl, indenyl, tetrahydroindenyl, benzoindenyl or fluorenyl, it being possible for the parent structures to carry additional substituents or to be bridged with one another. It is also possible for one of the radicals $R^3$ and $R^4$ to be a substituted nitrogen atom, with $R^{24}$ having the definition of $R^{17}$ and being preferably methyl, tert-butyl or cyclohexyl.

$R^5$, $R^6$, $R^7$, $R^8$, $R^9$, and $R^{10}$ are identical or different and are a hydrogen atom, a halogen atom, preferably a fluorine, chlorine or bromine atom, a $C_1$-$C_{10}$, preferably $C_1$-$C_4$ alkyl group, a $C_6$-$C_{10}$, preferably $C_6$-$C_8$ aryl group, a $C_1$-$C_{10}$, preferably $C_1$-$C_3$ alkoxy group, a radical —$NR^{16}_2$—, —$SR^{16}$—, —$OSiR^{16}_3$—, —$SiR^{16}_3$— or —$PR^{16}_2$—, in which $R^{16}$ is a $C_1$-$C_{10}$, preferably $C_1$-$C_3$ alkyl group or $C_6$-$C_{10}$, preferably $C_6$-$C_8$ aryl group or else, in the case of radicals containing Si or P, is a halogen atom, preferably chlorine atom, or pairs of adjacent radicals $R^5$, $R^6$, $R^7$, $R^8$, $R^9$, or $R^{10}$ form a ring with the carbon atoms connecting them. Particularly preferred ligands are the substituted compounds of the parent structures cyclopentadienyl, indenyl, tetrahydroindenyl, benzoindenyl or fluorenyl.

$R^{13}$ is

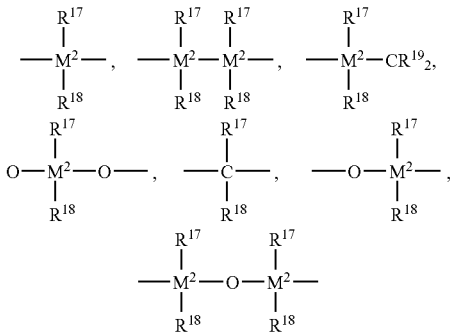

$=BR^{17}$, $=AlR^{17}$, —Ge—, —Sn—, —O—, —S—, =SO, $=SO_2$, $=NR^{17}$, =CO, $=PR^{17}$ or $=P(O)R^{17}$, $R^{17}$, $R^{18}$, and $R^{19}$ being identical or different and being a hydrogen atom, a halogen atom, preferably a fluorine, chlorine or bromine atom, a $C_1$-$C_{30}$, preferably $C_1$-$C_4$ alkyl, especially methyl, group, a $C_1$-$C_{10}$ fluoroalkyl, preferably $CF_3$ group, a $C_6$-$C_{10}$ fluoroaryl, preferably pentafluorophenyl group, a $C_6$-$C_{10}$, preferably $C_6$-$C_8$ aryl group, a $C_1$-$C_{10}$, preferably $C_1$-$C_4$ alkoxy, especially methoxy group, a $C_2$-$C_{10}$, preferably $C_2$-$C_4$ alkenyl group, a $C_7$-$C_{40}$, preferably $C_7$-$C_{10}$ aralkyl group, a $C_8$-$C_{40}$, preferably $C_8$-$C_{12}$ arylalkenyl group or a $C_7$-$C_{40}$, preferably $C_7$-$C_{12}$ alkylaryl group, or $R^{17}$ and $R^{18}$, or $R^{17}$ and $R^{19}$, each form a ring together with the atoms connecting them.

$M^2$ is silicon, germanium or tin, preferably silicon and germanium. $R^{13}$ is preferably $=CR^{17}R^{18}$, $=SiR^{17}R^{18}$, $=GeR^{17}R^{18}$, —O—, —S—, =SO, $=PR^{17}$ or $=P(O)R^{17}$.

$R^{11}$ and $R^{12}$ are identical or different and have the definition stated for $R^{17}$. m and n are identical or different and denote zero, 1 or 2, preferably zero or 1, with m plus n being zero, 1 or 2, preferably zero or 1.

$R^{14}$ and $R^{15}$ have the definition of $R^{17}$ and $R^{18}$.

Examples of suitable metallocenes are:
bis(1,2,3-trimethylcyclopentadienyl)zirconium dichloride,
bis(1,2,4-trimethylcyclopentadienyl)zirconium dichloride,
bis(1,2-dimethylcyclopentadienyl)zirconium dichloride,
bis(1,3-dimethylcyclopentadienyl)zirconium dichloride,
bis(1-methylindenyl)zirconium dichloride,
bis(1-n-butyl-3-methylcyclopentadienyl)zirconium dichloride,
bis(2-methyl-4,6-diisopropylindenyl)zirconium dichloride,
bis(2-methylindenyl)zirconium dichloride,
bis(4-methylindenyl)zirconium dichloride,
bis(5-methylindenyl)zirconium dichloride,
bis(alkylcyclopentadienyl)zirconium dichloride,
bis(alkylindenyl)zirconium-dichloride,
bis(cyclopentadienyl)zirconium dichloride,
bis(indenyl)zirconium dichloride,
bis(methylcyclopentadienyl)zirconium dichloride,
bis(n-butylcyclopentadienyl)zirconium dichloride,
bis(octadecylcyclopentadienyl)zirconium dichloride,
bis(pentamethylcyclopentadienyl)zirconium dichloride,
bis(trimethylsilylcyclopentadienyl)zirconium dichloride,
biscyclopentadienylzirconium dibenzyl,
biscyclopentadienylzirconium dimethyl,
bistetrahydroindenylzirconium dichloride,
dimethylsilyl-9-fluorenylcyclopentadienylzirconium dichloride,
dimethylsilylbis-1-(2,3,5-trimethylcyclopentadienyl)zirconium dichloride,
dimethylsilylbis-1-(2,4-dimethylcyclopentadienyl)zirconium dichloride,
dimethylsilylbis-1-(2-methyl-4,5-benzoindenyl)zirconium dichloride,
dimethylsilylbis-1-(2-methyl-4-ethylindenyl)zirconium dichloride,
dimethylsilylbis-1-(2-methyl-4-isopropylindenyl)zirconium dichloride,
dimethylsilylbis-1-(2-methyl-4-phenylindenyl)zirconium dichloride,
dimethylsilylbis-1-(2-methylindenyl)zirconium dichloride,
dimethylsilylbis-1-(2-methyltetrahydroindenyl)zirconium dichloride,
dimethylsilylbis-1-indenylzirconium dichloride,
dimethylsilylbis-1-indenylzirconium dimethyl,
dimethylsilylbis-1-tetrahydroindenylzirconium dichloride,
diphenylmethylene-9-fluorenylcyclopentadienylzirconium dichloride,
diphenylsilylbis-1-indenylzirconium dichloride,
ethylenebis-1-(2-methyl-4,5-benzoindenyl)zirconium dichloride,
ethylenebis-1-(2-methyl-4-phenylindenyl)zirconium dichloride,
ethylenebis-1-(2-methyltetrahydroindenyl)zirconium dichloride,
ethylenebis-1-(4,7-dimethylindenyl)zirconium dichloride,
ethylenebis-1-indenylzirconium dichloride,
ethylenebis-1-tetrahydroindenylzirconium dichloride,
indenylcyclopentadienylzirconium dichloride
isopropylidene(1-indenyl)(cyclopentadienyl)zirconium dichloride,
isopropylidene(9-fluorenyl)(cyclopentadienyl)zirconium dichloride,
phenylmethylsilylbis-1-(2-methylindenyl)zirconium dichloride, and the alkyl or aryl derivatives of each of these metallocene dichlorides.

The single-center catalyst systems are activated using suitable cocatalysts. Suitable cocatalysts for metallocenes of the formula I are organoaluminum compounds, especially aluminoxanes or else aluminum-free systems such as $R^{20}_x NH_{4-x} BR^{21}_4$, $R^{20}_x PH_{4-x} BR^{21}_4$, $R^{20}_3 CBR^{21}_4$ or $BR^{21}_3$. In these formulae x is a number from 1 to 4, the radicals $R^{20}$ are identical or different, preferably identical, and are $C_1$-$C_{10}$ alkyl or $C_6$-$C_{18}$ aryl, or two radicals $R^{20}$ form a ring together with the atom connecting them, and the radicals $R^{21}$ are identical or different, preferably identical, and are $C_6$-$C_{18}$ aryl which may be substituted by alkyl, haloalkyl or fluorine. In particular $R^{20}$ is ethyl, propyl, butyl or phenyl and $R^{21}$ is phenyl, pentafluorophenyl, 3,5-bistrifluoro-methylphenyl, mesityl, xylyl or tolyl.

Additionally a third component is often necessary in order to maintain protection against polar catalyst poisons. Suitable for this purpose are organoaluminum compounds such as triethylaluminum, tributylaluminum, etc., and also mixtures.

Depending on process it is also possible for supported single-center catalysts to be used. Preference is given to catalyst systems in which the residues of support material and cocatalyst do not exceed a concentration of 100 ppm in the product.

To prepare the hot melt compositions of the invention it is possible to use polyolefin metallocene waxes in unmodified form or in polar-modified form. Polar-modified waxes are prepared in conventional manner from a polar raw materials by oxidation with oxygenous gases, air for example, or by free-radical grafting reaction with polar monomers, examples being α,β-unsaturated carboxylic acids or derivatives thereof, such as acrylic acid, maleic acid or maleic anhydride, or unsaturated organosilane compounds such as trialkoxyvinylsilanes. The polar modification of metallocene polyolefin waxes by oxidation with air is described for example in EP 0 890 583, modification by grafting for example in U.S. Pat. No. 5,998,547 or JP 54-145785.

The invention further provides for the use of the hot melt compositions of the invention as hot melt adhesives.

In the hot melt compositions used as hot melt adhesives the polyolefin waxes are present preferably with a weight fraction of greater than or equal to 50%, more preferably between 50% and 99%, and with particular preference between 60% and 90% by weight. Further possible constituents are resins, waxes, and apolar or polar polymers such as ethylene-vinyl acetate copolymers, atactic poly-α-olefins (APAO), polyisobutylene, styrene-butadiene-styrene block polymers or styrene-isoprene-styrene block polymers, and, for particularly heavy-duty bonds, polyamides or polyesters. Examples of resin components which may be present include rosins and their derivatives or hydrocarbon resins, while possible waxes are hydrocarbon waxes such as Fischer-Tropsch paraffins, and polyolefin waxes not prepared using metallocene catalysts, it being possible for said waxes to have undergone apolar or polar modification, by means, for example, of oxidation or of grafting with polar monomers such as maleic anhydride. The hot melt adhesive compositions may further comprise fillers or auxiliaries such as plasticizers, pigments, and stabilizers such as antioxidants or light stabilizers.

The invention further provides for the use of the hot melt compositions of the invention as binders for producing roadmarkings.

In the hot melt compositions used as binders for roadmarking the polyolefin waxes are present preferably with a weight fraction of between 5% and 99% by weight.

In one particularly preferred embodiment of the invention, the polyolefin waxes are present in the hot melt compositions used as binders for roadmarking with a weight fraction of between 20% and 90% by weight.

In a further particularly preferred embodiment of the invention, the polyolefin waxes are present in the hot melt compositions used as binders for roadmarking with a weight fraction of between 50% and 99% by weight.

In the hot melt compositions used as binders for roadmarking the polyolefin waxes are present very preferably with a weight fraction of between 60% and 90% by weight.

Further possible constituents are apolar or polar polymers, resins, and waxes of the type described above, and also plasticizers, such as liquid paraffin, and antioxidants. For roadmarking use the binder is generally blended with further components such as fillers, e.g., sand or lime, and also pigments, e.g., titanium dioxide, and light-reflecting adjuvants such as glass beads, for example.

The examples which follow are intended to illustrate the invention but not to restrict it to them.

EXAMPLES

The melt viscosities were determined in accordance with DIN 53019 using a rotational viscometer, the dropping points in accordance with DIN 51801/2, the ring & ball softening points in accordance with DIN EN 1427, and the glass transition temperatures by means of differential thermoanalysis in accordance with DIN 51700. The weight-average molar mass $M_w$, the number-average molar mass $M_n$, and the resulting quotient $M_w/M_n$ were determined by gel permeation chromatography at 135° C. in 1,2-dichlorobenzene.

The metallocene polyolefin waxes used in accordance with the invention and listed in Table 1 were prepared by the process specified in EP-A-0 571 882.

TABLE 1

| Polyolefin waxes used | | | |
|---|---|---|---|
| | Product type | Softening point/ dropping point [° C.] | Viscosity at 170° C. [mPa.s] |
| Wax 1 (inventive) | propylene-ethylene copolymer wax (metallocene) | 88 | 6300 |
| Wax 2 (inventive) | propylene homopolymer wax (metallocene) | 143 | 60 |
| Licowax ® PP 220 | propylene homopolymer wax (Ziegler) | 158 | 700 |

Results of Performance Testing

A. Use in Hot Melt Adhesive Formulas

The waxes listed in Table 1 were used to prepare hot melt adhesive compositions in accordance with the mixing proportions set out in Table 2. The components were jointly melted and stirred at 180° C. for 1 h.

To test the cohesion, moldings were cast from the mixtures in accordance with DIN 53455 and their mechanical stability was tested in a tensile test.

To determine the low-temperature flexibility, test specimens measuring 250 mm×10 mm were produced and bent over a mandrel. The temperature was lowered in steps of 10, beginning at 0° C. The measurement parameter used was the temperature at which the test specimen fractures.

TABLE 2

Properties of the formula mixtures and performance results

| Example | Wax 1 [parts by weight] | Wax 2 [parts by weight] | Elvax ® 220 [parts by weight] | Licowax ® PP 220 [parts by weight] | Regalite ® 1140 [parts by weight] | Melting point [° C.] | Melt viscosity [mPas] | Glass transition temperature [° C.] | Low-temperature flexibility [° C.] | Cohesion [N/mm$^2$] |
|---|---|---|---|---|---|---|---|---|---|---|
| 1 | 36 | 45 | | | 19 | 148 | 936 | −16 | −17 | 3.2 |
| 2 | 56 | 30 | | | 14 | 140 | 2100 | −22 | −23 | 3.9 |
| 3 | 71 | 21 | | | 8 | 136 | 3370 | −24 | −26 | 3.8 |
| 4 (Comp.) | 10 | 30 | | | 60 | 144 | 960 | 16 | 18 | 1.4 |
| 5 (Comp.) | 14 | 21 | | | 65 | 138 | 2186 | 18 | 19 | 1.2 |
| 6 (Comp.) | 7 | 14 | | | 79 | 134 | 3130 | 35 | 35 | 0.8 |
| 7 (Comp.) | | | 48 | 5 | 47 | 158 | 23500 | −14 | −16 | 1.2 |
| 8 (Comp.) | | | 10 | 5 | 85 | 156 | 14720 | 12 | 11 | 0.6 |
| 9 (Comp.) | | | 66 | 5 | 29 | 140 | 32920 | −22 | −23 | 1.2 |

Elvax ® 220: ethylene-vinyl acetate copolymer, manufacturer: DuPont AG
Licowax ® PP 220: polypropylene wax from Ziegler synthesis, manufacturer: Clariant AG
Regalite ® 1140: hydrocarbon resin, manufacturer: Eastman Examples 1 to 3 are inventive. Examples 4 to 9, in contrast, are comparative examples.

Examples 1 to 3, in comparison with Examples 4 to 6, show that by increasing the wax fraction to more than 50% by weight it is possible to achieve a distinct improvement in cohesion and also a reduction in the glass transition temperature and an increase in the low-temperature flexibility. Hot melt adhesive compositions formulated conventionally with ethylene-vinyl acetate copolymer and conventional wax exhibit not only higher melt viscosities but also, by comparison, poorer cohesion and in some cases poorer low-temperature flexibility (Examples 7 to 9).

B. Use as Binder Component for Roadmarking

Example 10

Comparative Example 40 parts by weight of Vestoplast® 708 (APAO, Degussa AG), 40 parts by weight of Regalite® 1125 (hydrocarbon resin, Eastman), 4 parts by weight of liquid paraffin, 12 parts by weight of Licowax® PP 230 (Ziegler PP wax from Clariant AG) and 4 parts by weight of Licomont® AR 504 (PP wax grafted with maleic anhydride, for improving adhesion, Clariant AG) were mixed homogeneously at 180° C. 50 g of the melt obtained were spread over a sample plate of asphalt road covering measuring 10 cm×10 cm. After cooling, the coated plate was stored at −15° C. for 24 h.

Example 11

Inventive

A melt mixture homogenized at 180° C. and composed of 39 parts by weight of the wax 1 specified in Table 1 and 9 parts by weight of the wax 2 specified in Table 1, 40 parts by weight of Regalite® 1125 and 12 parts by weight of Licowax® PP 230 was used to produce a test coat in the manner described in Example 10. The coated plate was again stored at −15° C. for 24 h.

After the end of low-temperature storage, the plates were removed from the refrigeration cabinet. From an attempt to detach the test coat by hand from the substrate it was apparent that the mixture from Example 11 exhibited significantly better adhesion than the comparative mixture from Example 10.

What is claimed is:

1. A hot melt road marking composition comprising
   a. 20 to 90% by weight of one or more polyolefin waxes prepared using metallocene catalysts, have a dropping point or ring & ball softening point of between 80 and 165° C., have a melt viscosity, measured at a temperature of 170° C., of between 20 and 40 000 mPa·s, and have a glass transition temperature of not more than −10° C.,
   b. a component selected from the group consisting of a polyolefin polymer, a polar polymer, an apolar polymer, a plasticizer, an antioxidant, a stabilizer, and mixtures thereof,
   c. a further component selected from the group consisting of a filler, a pigment, a light reflecting adjuvant and mixtures thereof,
   wherein the one or more polyolefin waxes prepared using metallocene catalysts are not polar modified.

2. The hot melt road marking composition as claimed in claim 1, wherein the one or more polyolefin waxes have a dropping point or ring & ball softening point of between 90 and 160° C., a melt viscosity, measured at a temperature of 170° C., of between 50 and 30 000 mPa·s, and a glass transition temperature of not more than −20° C.

3. The hot melt road marking composition as claimed in claim 1, wherein the one or more polyolefin waxes have a number-average molar mass $M_n$ of between 500 and 20 000 g/mol, and a weight-average molar mass $M_w$ of between 1000 and 40 000 g/mol.

4. The hot melt road marking composition as claimed in claim 1, wherein the one or more polyolefin waxes are propylene homopolymer waxes.

5. The hot melt road marking composition as claimed in claim 1, wherein the one or more polyolefin waxes are copolymer waxes of propylene and one or more further monomers selected from the group consisting of ethylene and branched or unbranched 1-alkenes having 4 to 20 carbon atoms and the amount of structural units originating from propylene in the copolymer waxes is from 70 to 99.9% by weight.

6. The hot melt road marking composition as claimed in claim 1, wherein the one or more polyolefin waxes are copolymer waxes of ethylene and at least one branched or unbranched 1-alkene having 3 to 20 carbon atoms and the amount of structural units originating from the one or more 1-alkenes in the copolymer waxes is from 0.1% to 30% by weight.

7. The hot melt road marking composition as claimed in claim 1, wherein the one or more polyolefin waxes are present in the hot melt road marking composition in fractions of between 50% and 99% by weight.

8. The hot melt road marking composition as claimed in claim 1, wherein the one or more polyolefin waxes are present in the hot melt road marking composition in fractions of between 60% and 90% by weight.

9. The hot melt road marking composition as claimed in claim 5, wherein the copolymer waxes of propylene and one or more further monomers selected from the group consisting of ethylene and branched or unbranched 1-alkenes having 4 to 20 carbon atoms waxes have undergone polar modification.

10. The hot melt road marking composition as claimed in claim 6, wherein the copolymer waxes of ethylene and at least one branched or unbranched 1-alkene having 3 to 20 carbon atoms have undergone polar modification.

* * * * *